United States Patent
Shepherd

(10) Patent No.: US 10,411,463 B2
(45) Date of Patent: Sep. 10, 2019

(54) METHOD FOR USING CHEMICAL THERMODYNAMICS TO BUFFER THE VOLTAGE OF ELECTRIC CIRCUITS AND POWER SYSTEMS

(71) Applicant: Shepherd Hydricity, Inc., Ocean Park, WA (US)

(72) Inventor: Stephen H. Shepherd, Ocean Park, WA (US)

(73) Assignee: Shepherd Hydricity, Inc., Ocean Park, WA (US)

( * ) Notice: Subject to any disclaimer, the term of this patent is extended or adjusted under 35 U.S.C. 154(b) by 119 days.

(21) Appl. No.: 15/798,702

(22) Filed: Oct. 31, 2017

(65) Prior Publication Data

US 2018/0054052 A1  Feb. 22, 2018

Related U.S. Application Data

(63) Continuation of application No. 14/946,681, filed on Nov. 19, 2015, now Pat. No. 9,859,703.

(51) Int. Cl.
   *H02J 3/12*   (2006.01)
   *H02H 9/00*   (2006.01)
   *H02J 3/38*   (2006.01)
   *H02J 3/28*   (2006.01)

(52) U.S. Cl.
   CPC .............. *H02H 9/005* (2013.01); *H02J 3/12* (2013.01); *H02J 3/28* (2013.01); *H02J 3/387* (2013.01); *Y02E 70/30* (2013.01)

(58) Field of Classification Search
   CPC ........................................................ H02J 3/12
   USPC ....................................................... 307/152
   See application file for complete search history.

(56) References Cited

U.S. PATENT DOCUMENTS

| | | |
|---|---|---|
| 4,084,038 A | 4/1978 | Scragg et al. |
| 4,341,607 A | 7/1982 | Tison |
| 5,202,811 A | 4/1993 | Minks |
| 6,011,324 A | 1/2000 | Kohlstruck et al. |
| 6,184,593 B1 | 2/2001 | Jungreis |

(Continued)

FOREIGN PATENT DOCUMENTS

| | | |
|---|---|---|
| CN | 2161948 | 4/1994 |
| WO | 2014177175 | 11/2014 |
| WO | 2017087898 | 5/2017 |

OTHER PUBLICATIONS

International Search Report dated Apr. 13, 2017 in corresponding International Application No. PCT/US16/62938.

(Continued)

Primary Examiner — Adi Amrany
(74) Attorney, Agent, or Firm — Snell & Wilmer L.L.P.

(57) ABSTRACT

A method for buffering the voltage of an electric system that undergoes transient voltage changes includes the step of placing a new load upon the electric system by electrically connecting at least one electrochemical device to the electric system so that electrical current flows from the electric system to the electrochemical device. Also included are the steps of causing at least one electrochemical reaction to occur within the at least one electrochemical device; varying the new load placed upon the electric system as transient voltage changes in the electric system occur; and changing the electrical current from the electric system to the electrochemical device in a manner that retards transient voltage changes in the electric system that would occur in the absence of the steps of placing, causing, and varying.

15 Claims, 6 Drawing Sheets

(56) References Cited

U.S. PATENT DOCUMENTS

| | | |
|---|---|---|
| 6,747,370 B2 | 6/2004 | Abe |
| 6,787,933 B2 | 9/2004 | Claude et al. |
| 6,902,837 B2 | 6/2005 | McCluskey et al. |
| 7,701,087 B2 | 4/2010 | Eckroad et al. |
| 7,786,616 B2 | 8/2010 | Naden et al. |
| 7,892,407 B2 | 2/2011 | Gibson et al. |
| 7,957,846 B2 | 6/2011 | Hakim et al. |
| 8,268,471 B2 | 9/2012 | Sadoway et al. |
| 8,445,150 B2 | 5/2013 | Ballantine |
| 8,500,969 B2 | 8/2013 | Guelbenzu Michelena et al. |
| 8,866,334 B2 | 10/2014 | Donnelly et al. |
| 9,859,703 B2 | 1/2018 | Shepard |
| 2002/0058175 A1 | 5/2002 | Ruhl |
| 2006/0071476 A1 | 4/2006 | Johnson |
| 2006/0088739 A1 | 4/2006 | Ovshinsky |
| 2007/0001462 A1 | 1/2007 | McNeil |
| 2008/0217998 A1 | 9/2008 | Parmley |
| 2009/0130539 A1 | 5/2009 | Van Burdine |
| 2009/0165459 A1 | 7/2009 | Henriksen et al. |
| 2010/0156116 A1 | 6/2010 | Wolf |
| 2010/0231045 A1 | 9/2010 | Collins et al. |
| 2012/0186252 A1 | 7/2012 | Schmidt |
| 2012/0267952 A1 | 10/2012 | Ballatine et al. |
| 2012/0321915 A1 | 12/2012 | Meijer et al. |
| 2012/0326653 A1 | 12/2012 | Godrich et al. |
| 2013/0301320 A1 | 11/2013 | Mariadassou et al. |
| 2014/0273199 A1 | 9/2014 | Cole et al. |
| 2014/0352311 A1 | 12/2014 | De Boer |
| 2015/0014186 A1 | 1/2015 | Wang et al. |
| 2015/0080483 A1 | 3/2015 | Hanebuth et al. |
| 2015/0105923 A1 | 4/2015 | Beekmann |
| 2015/0270743 A1 | 9/2015 | Orthlieb et al. |
| 2016/0013729 A1 | 1/2016 | Josse et al. |
| 2017/0149237 A1 | 5/2017 | Shepherd |

OTHER PUBLICATIONS

Written Opinion dated Apr. 13, 2017 in corresponding International Application No. PCT/US16/62938.

USPTO; Non-Final Office Action dated Apr. 12, 2016 in U.S. Appl. No. 14/946,681.

USPTO; Final Office Action dated May 3, 2016 in U.S. Appl. No. 14/946,681.

USPTO; Advisory Action dated Aug. 26, 2016 in U.S. Appl. No. 14/946,681.

USPTO; Non-Final Office Action dated Nov. 25, 2016 in U.S. Appl. No. 14/946,681.

USPTO; Final Office Action dated May 11, 2017 in U.S. Appl. No. 14/946,681.

USPTO; Notice of Allowance dated Jul. 20, 2017 in U.S. Appl. No. 14/946,681.

USPTO; Notice of Allowance dated Jul. 27, 2017 in U.S. Appl. No. 14/946,681.

PCT; International Preliminary Report on Patentability dated May 31, 2018 in the International Application No. PCT/US2016/062938.

METHOD FOR USING CHEMICAL THERMODYNAMICS TO BUFFER THE VOLTAGE OF ELECTRIC CIRCUITS AND POWER SYSTEMS

CROSS-REFERENCE TO RELATED APPLICATION

This application is a continuation of U.S. application Ser. No. 14/946,681, entitled "METHOD FOR USING CHEMICAL THERMODYNAMICS TO BUFFER THE VOLTAGE OF ELECTRIC CIRCUITS AND POWER SYSTEMS," filed on Nov. 19, 2015, the contents of which are hereby incorporated by reference for any purpose in their entirety.

TECHNICAL FIELD

The present invention relates to the field of maintaining voltage stability in electric circuits, electrical power systems, or grids and, in particular, relates to a method for buffering the voltage of electric circuits and electric power transmission and distribution systems during transient undervoltage and overvoltage conditions.

BACKGROUND

Electricity is a prime and constant requirement for unhindered and smoothly running operations throughout the world, and electric power is a cornerstone technology upon which public and private organizations depend. The task of supplying electrical power on a reliable basis is accomplished by electric power systems. Conventional electrical power systems have a burden of providing continuous transmission and distribution of electrical power from sources of power generation which can suddenly change their power output levels to various consumers who draw power in varying, often rapidly fluctuating amounts, from the electrical power systems to which they are connected. Electric power transmission and distribution systems are also called power grids, or simply, grids.

Demand and consumption of electrical power is ever increasing. That demand places substantial strain on power grids. Recent and continuing additions of wind- and solar-based electrical generation to the power grids has increased power delivery complexity as these sources are prone to cease or increase generation without prior notice or planning as a result of unmanageable changes in the environment such as a passing cloud. Cascading power outages can occur as a result of various fluctuations in voltage of connected power grids. Such outages (c.f., the 2005 and 2011 Southwestern U.S. and Mexico regional blackouts, the 1965, 1977, and 2003 Northeastern U.S. and Canada regional blackouts, the 2006 Franco-German blackout, and the 1999 Southern Brazil blackout) result in disruptions of government and public services, industry and private lives that cause significant economic losses and deaths.

Control of grid voltage is important for proper operation of electrical power equipment. Without proper voltage control, connected electrical equipment can be damaged or destroyed by overheating. Voltage collapse can occur as a result of an increase in load on power grids or insufficient generation of electric power. Voltage increase can occur as a result of an increase in generation or a decrease in load. Also, various natural or man-made phenomena, including electromagnetic pulses, can increase grid voltage above design levels.

Conventional Transmission and Distribution systems are designed to operate at a nominal voltage with minimum and maximum voltage limits for both abnormal and emergency operation specified and established according to safety guidelines for equipment protection. However, when power demand surges or generation is reduced, grid voltage may undesirably decrease towards or below a lower voltage limit or may undesirably increase towards or above an upper voltage limit.

Conventional systems rely on human operators or properly programmed computers to reconfigure the grid system to control fluctuations in the grid voltage. Computers is meant to describe any programmable electronic device, such as a sensor. Following the protocol of conventional systems, a grid operator must: (i) observe or be alerted to voltage changes occurring from power demand surges or generation reductions; and (ii) assess and respond by taking immediate actions to reconfigure the grid to bring voltage back within an acceptable level. The existing systems and methods for controlling reductions in transient grid voltage require action by an operator or a properly programmed and functioning computer to cause conventional electric power systems to shed some or all load connected to the system or to connect additional generation to the system. Similarly, those existing systems and methods for controlling increases in transient grid voltage require action by an operator or a properly functioning computer to add load onto the system or to reduce or disconnect generation from the system. In addition, when external electromagnetic pulses induce overvoltage, some conventional systems and methods attempt to respond by connecting a shunt once the pulse-generating event is detected to divert the pulse around vulnerable electrical components via a low-inductance, high-current-capacity shunt circuit.

Conventional systems and methods for controlling the grid voltage in response to transient undervoltage and overvoltage conditions also are not designed to take into account the substantial transient increase in electrical energy in the electric power transmission and distribution systems generally. Specifically, those conventional systems and methods do not take into account the voltages of the neutral phase that can be created in a geomagnetically-induced voltage condition.

SUMMARY

The invention may be characterized as method for buffering the voltage of an electric system that undergoes transient voltage changes includes the step of placing a new load upon the electric system by electrically connecting at least one electrochemical device to the electric system so that electrical current flows from the electric system to the electrochemical device. Also included are the steps of causing at least one electrochemical reaction to occur within the at least one electrochemical device; varying the new load placed upon the electric system as transient voltage changes in the electric system occur; and changing the electrical current from the electric system to the electrochemical device in a manner that retards transient voltage changes in the electric system that would occur in the absence of the steps of placing, causing, and varying. The step of causing electrochemical reactions may include using water electrolysis to produce a product that is a fuel, and the method may further include producing electric power and delivering it to the electric system. The electrochemical devices used in the method may apply chemical thermodynamics to retard increasing and decreasing electric system voltage transients and cause the transient electric system voltage to remain within a pre-specified voltage range. The method may also include connecting one or more voltage support units to provide electric power.

Another aspect of the present invention is a method using chemical thermodynamics to buffer grid voltage. The method employs a grid-voltage-control system comprised of one or more electrochemical devices for automatically and inherently controlling the voltage of an electrical transmission and distribution grid system. The grid-voltage-control system (also referred to as the grid system) also includes one or more transformers operationally coupled to at least one of the transmission or distribution lines of the electrical grid system. When the grid system transmits alternating current, one or more rectifying devices is coupled to the electrical grid system through the one or more transformers to produce a proportionate direct current at a desired, constant fraction of the alternating current transmission voltage. When the grid system transmits direct current, a circuit is coupled through the one or more suitable transformers such as Brentford transformers or precision resistor voltage dividers, to produce a proportionate direct current at a desired, constant fraction of the direct current transmission voltage. One or more electrochemical devices is coupled to the grid system through the one or more transformers and the proportionate direct current circuit, and the electrochemical devices are configured to produce one or more chemical-reaction products via an electrolysis process in which direct current is applied to a chemical system to cause an otherwise non-spontaneous chemical reaction in each of the electrochemical devices, and a voltage support unit is coupled to the grid system through the one or more transformers. The voltage support unit is configured as a contingency electric power generator to increase the grid voltage during severe under-voltage transients by utilizing oxidation and reduction of one or more chemical-reaction products produced by the above-described electrochemical devices.

In an embodiment to the present disclosure, the method includes a voltage control system for automatically and inherently controlling the voltage of an electric circuit. The voltage control system includes one or more connections to an electric circuit; and, when the circuit carries alternating current, one, or more rectifying devices coupled to the electric circuit to produce a proportionate direct current at a desired, constant fraction of the alternating current circuit voltage; or, when the circuit carries direct current, a circuit coupled to the circuit through the one or more suitable transformers, such as Brentford transformers or precision resistor voltage dividers, to produce a proportionate direct current at a desired, constant fraction of the direct current circuit voltage; one or more electrochemical devices coupled to the electric circuit through the one or more transformers and the proportionate direct current circuit, the one or more electrochemical devices configured to produce one or more reaction products by carrying out an electrolysis process in which direct current is applied to a chemical system to drive an otherwise non-spontaneous chemical reaction in each of the one or more electrochemical devices and a voltage support unit coupled to the electric circuit through the one or more transformers.

In an embodiment of the present method disclosure, an overvoltage above the characteristic chemical thermodynamics Standard Reference Potential for a labile species (hereinafter known as "standard reference potential overvoltage") is supplied to the electrochemical device to overcome thermodynamic non-idealities of the apparatus and its electrochemical system in order to reduce a labile species.

In an embodiment of the present method disclosure, the chemical thermodynamics of the method's grid voltage control unit provides feedback to the electrical transmission and distribution grid system in opposition to transient voltage changes of the electric system when the grid voltage decreases below a specified nominal operating voltage of the electrical transmission and distribution grid system. In another embodiment of the present method disclosure, the method's voltage support unit reduces the electrical demand of the load by utilizing Nernstian behavior of labile ions of the electrochemical system applicable at the concentration and electrode conditions of each of the one or more electrochemical devices coupled to the electrical transmission and distribution grid system. The Nernstian behavior of electrochemical reactions is utilized to reduce the load coupled to the electrical grid system and retard further decreases of the grid voltage during transient under-voltage conditions. In yet another embodiment of the present method disclosure, the chemical thermodynamics of the method's grid voltage control unit also provides feedback by terminating the electrical demand loading of one or more electrochemical devices load coupled to the electrical transmission and distribution grid system. The electrical demand of the load is terminated when the proportionate direct current (DC) voltage that is proportionate to the grid voltage dropping to a design operational voltage limit of the grid and provided to the one or more electrochemical devices decreases below the standard reference potential overvoltage of a labile ion associated with each of the one or more electrochemical devices.

In an embodiment of the present method disclosure, the chemical thermodynamics of the method's voltage control unit provides feedback to an electric system or circuit in opposition to transient voltage changes of the electric system or circuit when the system or circuit voltage increases above a specified nominal operating voltage of the electric system or circuit. In another embodiment of the present method disclosure, the voltage control unit automatically reduces an excessive grid voltage on the electrical grid system of the electrical grid system by utilizing the one or more electrochemical devices coupled to the electrical grid system. In an embodiment of the present method disclosure, the method's voltage control unit is configured to control the grid voltage of the electrical grid system when the grid voltage increases above the specified nominal voltage by adding load to the electrical grid system. In yet another embodiment of the present method disclosure, the voltage support unit increases the electrical demand of the load by utilizing Nernstian behavior of labile ions of the electrochemical system applicable at the concentration and electrode conditions of each of the one or more electrochemical devices coupled to the electrical transmission and distribution grid system. The Nernstian behavior of electrochemical reactions is utilized to increase the load coupled to the electrical grid system and retard further increases of the grid voltage during transient over-voltage conditions.

In an embodiment to the present disclosure, the theories, conclusions, and formulae of legendary electrochemists Walther Nernst, John Butler, Max Vollmer, and Julius Tafel are independently validated, supported, and explained by use of Chemical Thermodynamics in which the chemical potential of an electrochemical system in an electrochemical apparatus is the difference between the energy barriers for taking electrons from and for giving electrons to the working electrode that is setting the system's electrochemical potential.

In an embodiment to the present disclosure, much of loading upon a transmission line is by inductive loads. The bulk of inductive loads served by the transmission line are inductive alternating current motor loads. As long as an alternating current motor is working reasonably close to its design parameters its speed will be essentially constant. Its load will apply a torque to the motor shaft and this torque multiplied by the speed defines the load (mechanical power). If the speed is constant most loads (e.g., pumps and compressors) will demand a fixed torque so the motor will see a fixed mechanical power demand even as voltage varies. For a change in voltage without a change in frequency the motor will attempt to continue to run at the same speed. The voltage is supplied by the transmission line to the motor. The product of voltage and current is the electrical power to the motor. The motor draws current to make its electrical power intake equal its mechanical power output. If the transmission line drops the voltage supplied, the motor will automatically compensate by drawing more current to keep the product of voltage and current a constant. The change in current follows Ohm's law and becomes an increasing load on the transmission line which drives the transmission line voltage even lower. The derivative of current with respect to current is a constant indicating that the increase in transmission line loading is a linear function of the transmission line voltage decrease. In contrast, the response of an electrochemical device to a reduction in applied voltage is a reduction of load as the reaction slows down. The relationship between voltage and current for an electrochemical device is governed by chemical thermodynamics and commonly referred to as Nernstian behavior. The Nernstian behavior of an electrochemical cell considering that both a cathodic and an anodic reaction occur on the same electrode can be expressed by the Butler-Volmer equation which describes how the electrical current on an electrode depends on the electrode potential. The derivative of current with respect to voltage in the Butler-Volmer equation is an exponential function revealing that the decrease in loading of an electrochemical device upon the transmission line is exponential when transmission line voltage decreases. It also reveals that the increase in loading of an electrochemical device upon the transmission line is exponential when transmission line voltage increases. Hence, the exponential changes in the loading of an electrochemical device can oppose and buffer the linear changes in loading of inductive loads during voltage transients either up or down.

In an embodiment to the present disclosure, the Butler-Volmer equation includes consideration of non-Nernstian behavior encountered in electrochemical systems at high voltages when labile ion transport to the surface of an electrode is impeded by congestion of labile ions as independently expressed in the Tafel Equation.

In an embodiment to the present disclosure, the capability of the grid voltage control unit electrochemical devices to fully terminate a step transient voltage event within a specified transmission voltage control range depends upon the sizing of the electrochemical devices and characteristics of the inductive and resistive loads upon the grid and upon design current losses peculiar to long transmission lines and upon the characteristic current and voltage relationships of the particular electrochemical device apparatus. The balancing of aggregate current and voltage relationships appears somewhat functionally similar to the characteristic acid-base balancing that occurs in wet chemistry pH buffers and that terminology has been adopted to describe the electrochemical device capability to offset a step transient over- or under-voltage event. In a further embodiment to the present disclosure, the sizing of an electrochemical device to fully buffer and retard a desired range of step transient voltage events can be determined by solving a four factor differential equation at boundary conditions representative of the desired voltage control range. The four factors needed to determine the buffer capacity of a grid voltage control unit are the derivatives of current with respect to voltage for inductive loads, resistive loads, long distance transmission losses, and the loads of the particular electrochemical devices selected for use in the grid voltage control unit. In a further embodiment to the present disclosure, the change in current for inductive loads follows Ohm's law, E=IR where R is the impedance. Rewriting, $I=E/R$ Therefore the derivative of Current with respect to voltage, dI/dE can be written as a constant:

$1/R$

Purely resistive loads such as heaters will also follow Ohm's law and have a constant as their derivative as well. However, as long as they do not require a constant power, as does a controlled-speed inductive motor, their resistance stays the same as voltage drops. Thus, they reduce current demand and power output when voltage drops. Were the grid evenly divided between resistive and inductive loads, the two effects would essentially cancel each other out, ensuring voltage stability. However, the bulk of grid power supplies inductive loads giving the grid a characteristic instability during undervoltage transients. It is primarily this characteristic instability that the method of this invention cures in order to control grid voltage. The current in long transmission lines as a function of spatial distance and time also follows Ohm's law but is expressed as the difference between the forward-propagating wave and the backwards-propagating wave. The differential form reduces to:

$dI/dE = f(t-z/v)/Z0 - g(t-z/v)/Z0$

Where: f(x) and g(x) are waveform functions for the forward and backwards-propagating waves, respectively, and z=spatial location (distance)

Z=impedance, $Z_0$=intrinsic impedance, v=velocity of propagation, and t=time

Assuming constant design and environmental conditions along the transmission line means that the differential form also essentially behaves as a constant, $1/Z_0$ Therefore, the overall differential equation for grid power response with an electrochemical buffer is dI/dE (inductive load kVA)+/−dI/dE (resistive load kVA)+/−dI/dE (transmission line configuration loading kVA)+/−dI/dE (electrochemical buffer load kVA)

The +/− assignments above depend upon whether voltage is increasing or decreasing from the initial reference transmission line voltage.

The Nernstian behavior of an electrochemical cell considering that both a cathodic and an anodic reaction occur on the same electrode can be expressed by the Butler-Volmer equation which describes how the electrical current on an electrode depends on the electrode potential. Hence, the electrochemical component of the buffer sizing differential equation can be obtained from the Butler-Vollmer Equation:

$$I = A \cdot j_0 \cdot \left\{ \exp\left[\frac{\alpha_c nF}{RT}(E - E_{eq})\right] - \exp\left[-\frac{\alpha_c nF}{RT}(E - E_{eq})\right] \right\}$$

which uses standard chemical thermodynamics notation and nomenclature.

Rewriting as the derivative, $$I = I_{ZERO}[\exp(C1[E-E_{REF}])-I_{ZERO}[\exp(C2[E-E_{REF}])$$

Where C1 and C2 are the aggregate thermodynamic constants applicable to the characteristics of the electrolyzer apparatus selection from the original equation.

Therefore, the derivative of Current with respect to the voltage supplied to the electrolyzer, dI/dE can be written as:

$$dI/dE = ((C1[E-E_{REF}]) \exp(C1[E-E_{REF}])-1)-(C2[E-E_{REF}]\exp((C2[E-E_{REF}]-1)$$

Therefore, the overall differential equation to be solved at the boundary conditions to size the electrochemical grid buffer to fully terminate voltage changes within the specified transmission voltage control range is, for a transmission line of constant design and environmental conditions:

$$dI/dE \text{ (inductive load kVA)} +/- dI/dE \text{(resistive load kVA)} +/- dI/dE \text{(transmission line configuration loading kVA)} +/- dI/dE \text{(electrochemical buffer load kVA)} = 0 = 1/R_{INDUCTIVE} +/- 1/R_{RESISTIVE} +/- 1/Z_0 +/- ((C1[E-E_{REF}]) \exp(C1[E-E_{REF}])-1) - (C2[E-E_{REF}]\exp((C2[E-E_{REF}]-1)$$

In the event the transmission line has variable design and environmental conditions the net differential equation may be solved piecemeal as a function of distance. This condition is rare and hence of little interest to the present disclosure. As before, the +/− assignments above depend upon whether voltage is increasing or decreasing from the initial reference voltage. In another embodiment of the present method disclosure, there is an apparent amplification of the load changes that the one or more electrochemical devices place upon the grid when voltage varies compared to that of other, non-electrochemical device grid loads as the load of the one or more electrochemical devices will change exponentially as voltage varies away from the desired nominal value while inductive loads will change in a linear fashion. Therefore, a relatively small nominal load of one or more electrochemical devices can provide transient voltage stability when the much greater connected inductive loads vary linearly during voltage transients.

In another embodiment of the present method disclosure, the grid voltage control unit together with its voltage support unit provides ancillary services of regulation, operating reserve, black-start, and reactive power to the grid. The term "ancillary services" is used to refer to the variety of operations beyond generation and transmission that are required to maintain grid stability and security. Ancillary services are specialty services and functions provided to the electric grid that facilitate reliability and support the continuous flow of electricity so that supply will always meet demand. The United States Federal Energy Regulatory Commission states: "Ancillary services maintain electric reliability and support the transmission of electricity." They identify four different kinds of ancillary services: regulation, operating reserves, black-start, and reactive power in their *Energy Primer: A Handbook of Energy Market Basics*, July 2015 at page 55.

In an embodiment of the present method disclosure, the method further includes a voltage support unit coupled to the electrical grid system or circuit which utilizes the one or more reaction products produced from the electrolysis of water as fuel to power a voltage support unit.

In yet another embodiment, the method's voltage support unit automatically provides black start electrical power following system separation which may be used to restart major generation sources or to provide emergency power to select grid customers. In another embodiment in which the proportionate direct current (DC) voltage is designed to drop below the standard reduction overpotential at a grid voltage above the specified system separation grid voltage the voltage support unit can be activated automatically before system separation to raise the grid voltage of the electrical grid system a nominal amount potentially avoiding system separation.

In yet another embodiment of the present method disclosure, the voltage support unit coupled to the electrical grid system utilizes the one or more reaction products produced from the electrolysis of water to raise the grid voltage of the electrical grid system by performing the steps of drawing hydrogen stored in a hydrogen storage unit; supplying the hydrogen drawn from the hydrogen storage unit to a hydrogen-fueled combustion driven-electrical generator for powering the electrical generator through a hydrogen supply line and raising the grid voltage of the electrical grid system by supplying the electrical grid system with electrical power produced by the electrical generator. In yet another embodiment of the present method disclosure, the electrical generator utilized for the production of the real and reactive power is a hydrogen combustion turbine-driven electrical generator. In another embodiment, one or more storage units contains reserve aqueous electrolyte at a pressure head sufficient to replenish the electrochemical device when needed.

In yet another embodiment of the present method disclosure, the hydrogen supply line is associated with a supply valve for enabling contingent supply of stored hydrogen to the electrical generator. The supply valve opens automatically when current in each of the one or more electrochemical devices drops to zero because the proportionate direct current (DC) voltage supplied to the electrochemical device has dropped below the standard reference potential overvoltage in the manner discussed above.

In another embodiment of the present method disclosure, the voltage support unit is further configured to raise the grid voltage of the electrical grid system by utilizing at least one or more fuel cells and, if the electrical grid system carries alternating current (AC), one or more inverters coupled to the electrical grid system.

In yet another embodiment of the present method disclosure, each of the one or more fuel cells is coupled to a hydrogen storage unit.

In yet another embodiment of the present method disclosure, the voltage support unit raises the grid voltage of the electrical grid system by inducing reaction of the hydrogen and oxygen in each of the one or more fuel cells.

In yet another embodiment of the present method disclosure, each of the one or more fuel cells is associated with one or more valves for enabling supply of the hydrogen from one or more hydrogen storage units and the oxygen from one or more oxygen storage units. The valve is opened automatically when the current in each of the one or more electrochemical devices drops to zero because the proportionate direct current (DC) voltage supplied to the electrochemical device has dropped below the standard reference potential overvoltage in the manner discussed above.

In yet another embodiment of the present method disclosure, the hydrogen supply line valves to any voltage support unit may be opened by a local or remote grid operator to actuate the voltage support unit for any reason at any time.

In yet another embodiment of the present method disclosure, the loading on the electrical grid system is increased based on an increase in a reaction rate in each of the one or more electrolysis units. The increase in the reaction rate results from an increase in the grid voltage of the electrical grid system of the electrical grid system. In yet another embodiment of the present method disclosure, the voltage support unit automatically reduces the excessive grid voltage on the electrical grid system by increasing loading on the electrical grid system by utilizing the one or more electrochemical devices coupled to the electrical grid system. In yet another embodiment of the present method disclosure, the loading on the electrical grid system is increased by utilizing the Nernstian behavior of the labile ions of the electrochemical system applicable at the concentration and the electrode conditions of each of the one or more electrochemical devices coupled to the electrical grid system.

In yet another embodiment of the present method disclosure, the increase in the loading on the electrical grid system retards an increase in the grid voltage during a transient over-voltage condition.

In yet another embodiment of the present method disclosure, the one or more electrochemical devices is coupled to the neutral circuit of a grid transformer to increase the loading on the electrical grid system neutral circuitry and retard any voltage increase on the neutral circuit when an external event induces a voltage in this circuitry. By doing so the method avoids overheating of the grid transformer protecting it from severe damage. In yet another embodiment of the present method disclosure, the one or more electrochemical devices are configured to capture an excessive amount of external event-induced electrical energy from the electrical grid system; convert the captured excessive amount of the electrical energy into a chemical form of potential energy and store the chemical potential energy in one or more storage units.

In an embodiment of the present method disclosure, the voltage control unit utilizes the Nernstian behavior of the labile ions of the electrochemical system applicable at the concentration and the electrode conditions of each of the one or more electrochemical devices coupled to the electrical grid system for controlling the grid voltage within the design and operating limits without voltage monitoring and operator action.

In an embodiment of the present method disclosure, each of the one or more electrochemical devices is configured to perform the electrolysis of water.

In an embodiment of the present method disclosure, the one or more reaction products are produced by carrying out the electrolysis of water is hydrogen and oxygen.

In an embodiment of the present method disclosure, a value of the proportionate direct current (DC) voltage supplied for the electrolysis of water is greater than the value of the standard reference potential required for performing the electrolysis of water under ideal thermodynamic conditions.

In another embodiment of the present method disclosure, the value of the proportionate DC voltage potential is greater than or less than the value of the standard reference potential by an amount or percentage.

In yet another embodiment of the present method disclosure, the amount or percentage is based on physical characteristics of the electrochemical device apparatus and its contained chemical system.

In an embodiment of the present method disclosure, the system further includes a storage unit for storing the hydrogen produced by the electrolysis of water in each of the one or more electrolysis units.

In an embodiment of the present method disclosure, the system further includes a storage unit for storing the oxygen produced by the electrolysis of water in each of the one or more electrolysis units. In another embodiment, one or more storage units contains reserve aqueous electrolyte at a pressure head sufficient to replenish the electrochemical device when needed.

In another aspect of the present method disclosure, the grid-voltage-control system for raising grid voltage of an electrical grid system during transient under-voltage conditions. The grid-voltage-control system includes one or more electrochemical devices operationally coupled to transmission lines of the electrical grid system, the one or more electrochemical devices is configured to provide one or more reaction products by performing electrolysis; one or more storage units to store the one or more reaction products; a voltage support unit coupled to the one or more electrochemical devices and the one or more storage units, the voltage support unit is configured to trigger supply of a reaction product of the one or more reaction products stored in a storage unit to an electrical generator coupled; generate electrical power from the electrical generator coupled to the electrical grid system by utilizing the supplied reaction product; and providing the electrical power to the electrical grid system for raising the grid voltage of the electrical grid system.

In an embodiment of the present method disclosure, the one or more electrochemical devices is operationally coupled to the electrical grid systems by one or more transformers and one or more rectifying devices for enabling initiation of an electrochemical reaction in each of the one or more electrochemical devices.

In another embodiment of the present method disclosure, each of the one or more electrochemical devices is an electrochemical cell.

In another embodiment of the present method disclosure, each of the one or more electrochemical devices is a water electrolysis unit.

In another embodiment of the present method disclosure, each of the one or more electrochemical devices is an organic semiconductor.

In an embodiment of the present method disclosure, the one or more reaction products produced from electrolysis of water are hydrogen and oxygen.

In an embodiment of the present method disclosure, the reaction product of the one or more reaction products supplied to the electrical generator is hydrogen.

In an embodiment of the present method disclosure, the method's voltage support unit raises the grid voltage of the electrical grid system by utilizing Nernstian behavior of labile ions of the electrochemical system labile ions of the electrochemical system of the electrochemical system at concentration and electrode conditions of each of the one or more electrochemical devices coupled to the electrical grid system.

In an embodiment of the present method disclosure, the electrical generator utilized for the production of the real and reactive power is a hydrogen combustion-driven turbine generator.

In an embodiment of the present method disclosure, a supply line is associated with a supply valve for enabling supplying of the hydrogen to the electrical generator. The supply valve is opened automatically when current in each of the one or more electrochemical devices drops to zero during the transient under-voltage conditions.

In yet another aspect of the present method disclosure, the method uses a grid-voltage-control system for raising grid voltage of an electrical grid system during transient under-voltage conditions. The grid-voltage-control system includes one or more electrochemical devices coupled to transmission lines of the electric power system, the one or more electrochemical devices is configured to provide one or more reaction products by performing electrolysis; one or more storage units to store the one or more reaction products; a voltage support unit coupled to each of the one or more storage units, the voltage support unit includes one or more fuel cells and one or more inverters, the voltage support unit is configured to receive the one or more reaction products from each of the one or more storage units and induce reaction between each of the one or more reaction products in each of the one or more fuel cells. The voltage support unit raises the grid voltage of the electrical grid system by utilizing the induced reaction, one or more fuel cells, and, if the electrical grid system carries alternating current, each of the one or more inverters. In an embodiment of the present method disclosure, the one or more electrochemical devices are configured for performing electrolysis of water. In an embodiment of the present method disclosure, the one or more reaction products are hydrogen and oxygen.

In an embodiment of the present method disclosure, each of the one or more fuel cells is associated with a valve for enabling supply of the one or more reaction products from the corresponding one or more storage units. The valve is opened automatically when the current in each of the one or more electrochemical devices drops to zero.

In yet another aspect of the present method disclosure, the grid-voltage-control system for automatically reducing excessive grid voltage on an electrical grid system. The grid-voltage-control system includes one or more electrochemical devices, the one or more electrochemical devices is coupled to the electrical grid system. The one or more electrochemical devices are configured to add a load on the electrical grid system at nominal grid voltage and to increase that load on the electrical grid system to enable reduction of excessive grid voltage on the electrical grid system. The load is added on the electrical grid system based on a pre-determined criterion.

In an embodiment of the present method disclosure, the pre-determined criterion includes drawing current from the electrical grid system by each of the one or more electrochemical devices during the transient over-voltage conditions. The one or more electrochemical devices is configured to operate during the transient over-voltage conditions.

In an embodiment of the present method disclosure, the one or more electrochemical devices is further configured to capture an excessive amount of electrical energy from the electrical grid system; convert the captured excessive amount of the electrical energy into a chemical form of potential energy and store the potential energy in a storage unit.

In yet another aspect of the present method disclosure, the grid-voltage-control system for protecting an electrical grid system against a grid over-voltage condition includes one or more electrochemical devices coupled to the electrical grid system, the one or more electrochemical devices is configured to increase a loading on the electrical grid system by utilizing Nernstian behavior of each of the one or more electrochemical devices coupled to the electric power system and enable retardation of increase in grid voltage of the electrical grid system of the electric power system by utilizing the increase in the loading on the electrical grid system.

BRIEF DESCRIPTION OF THE FIGURES

Figure 1:
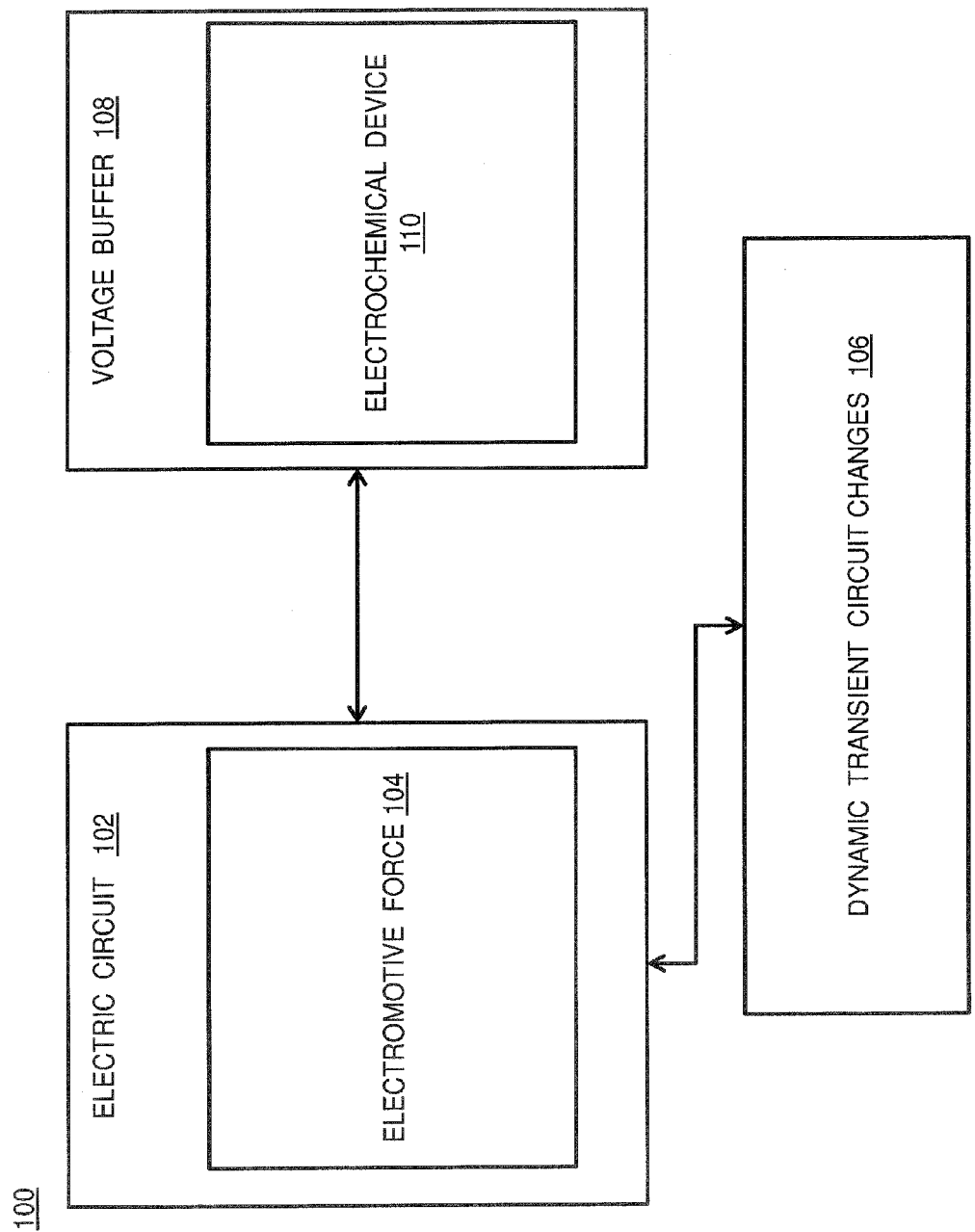
Figure 2:
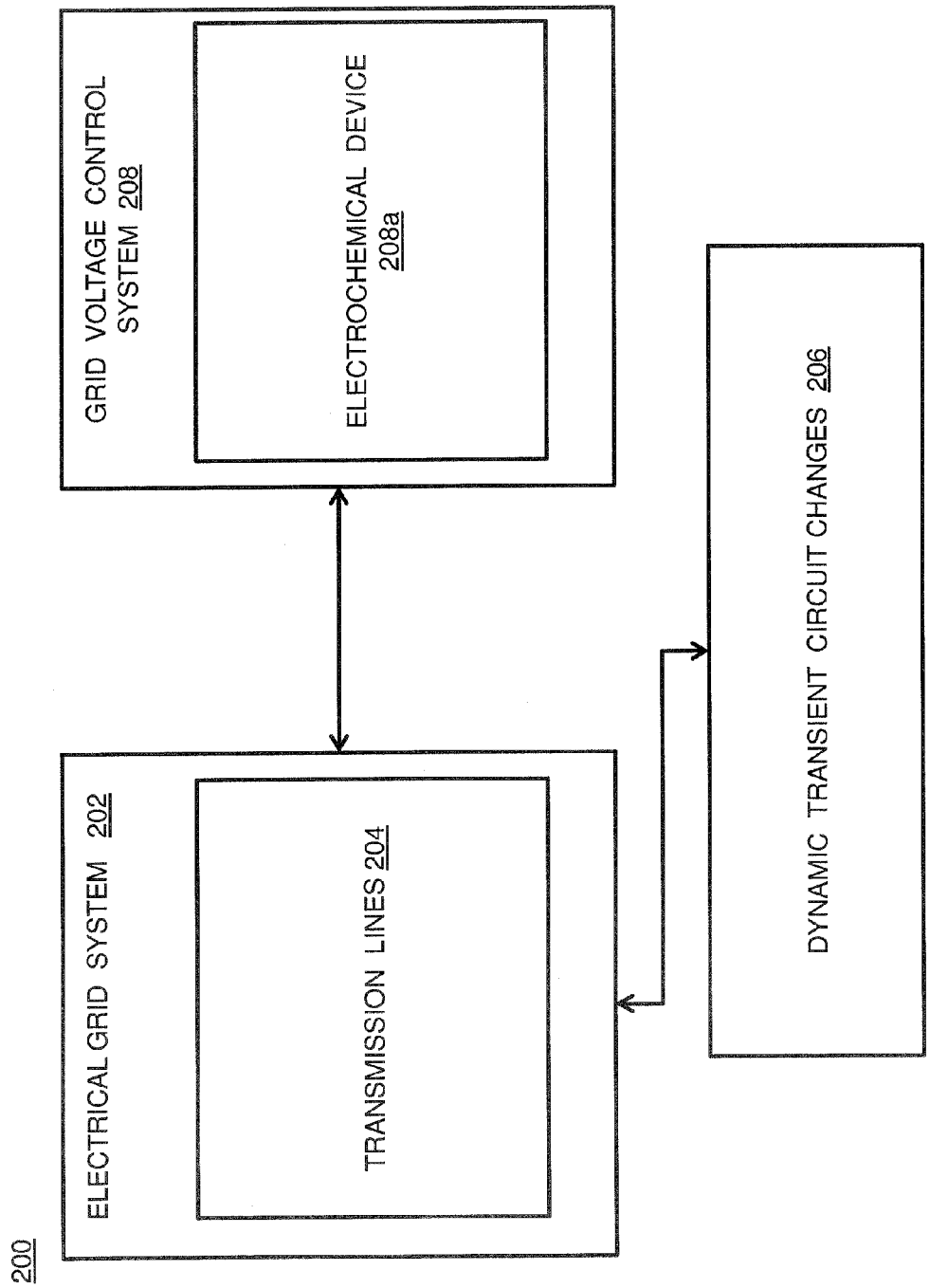
Figure 3A:
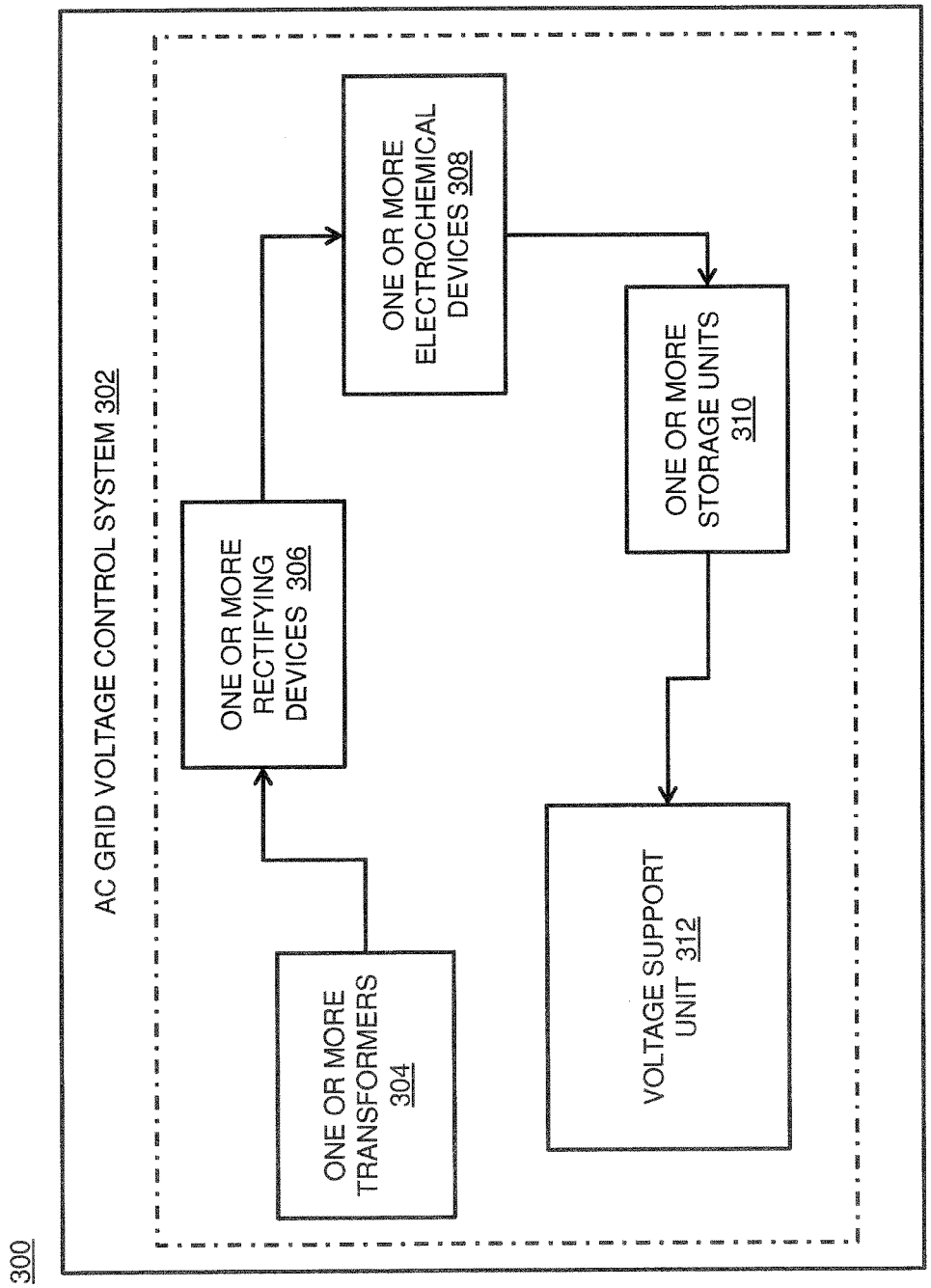
Figure 3B:
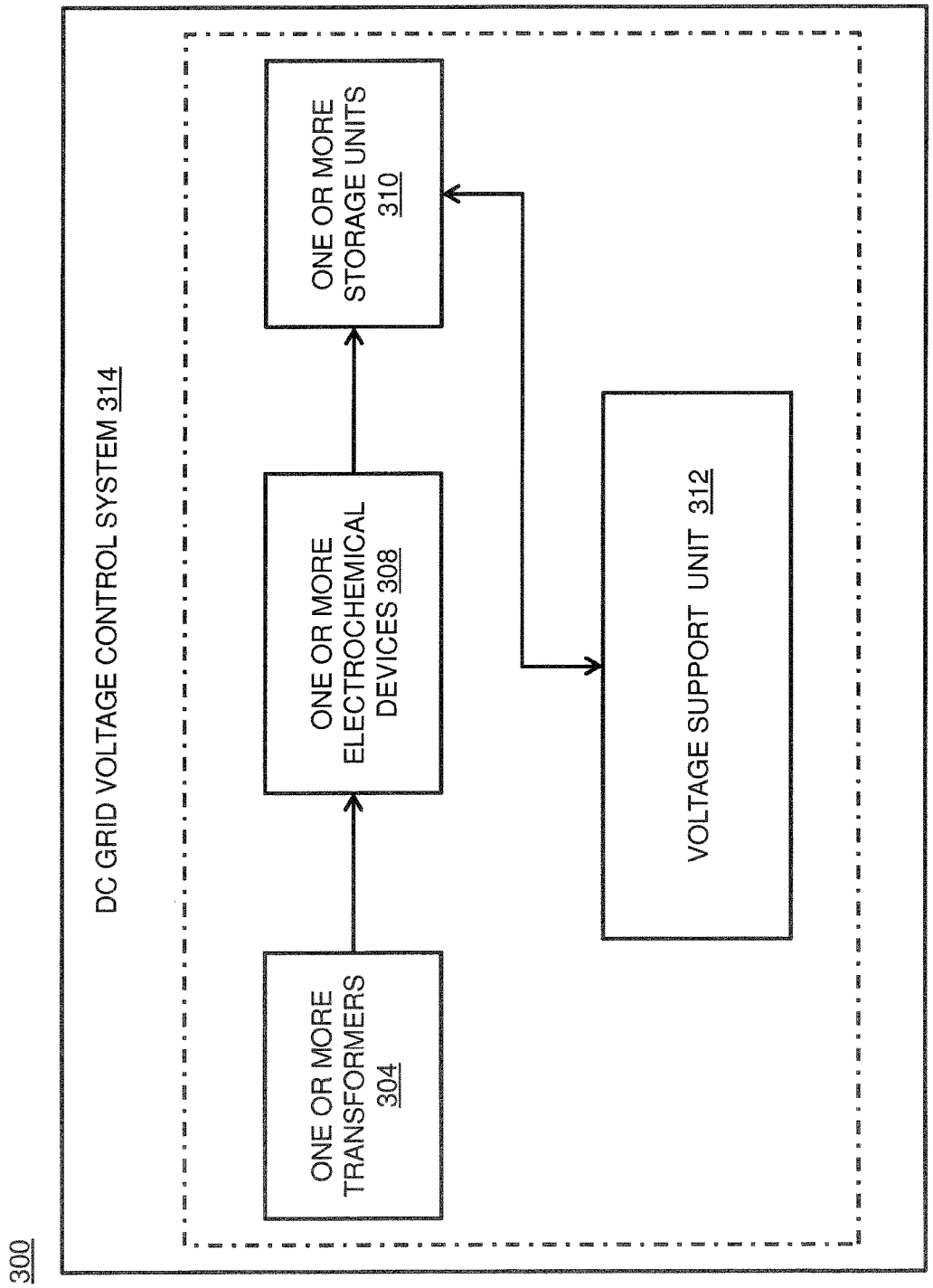
Figure 4:
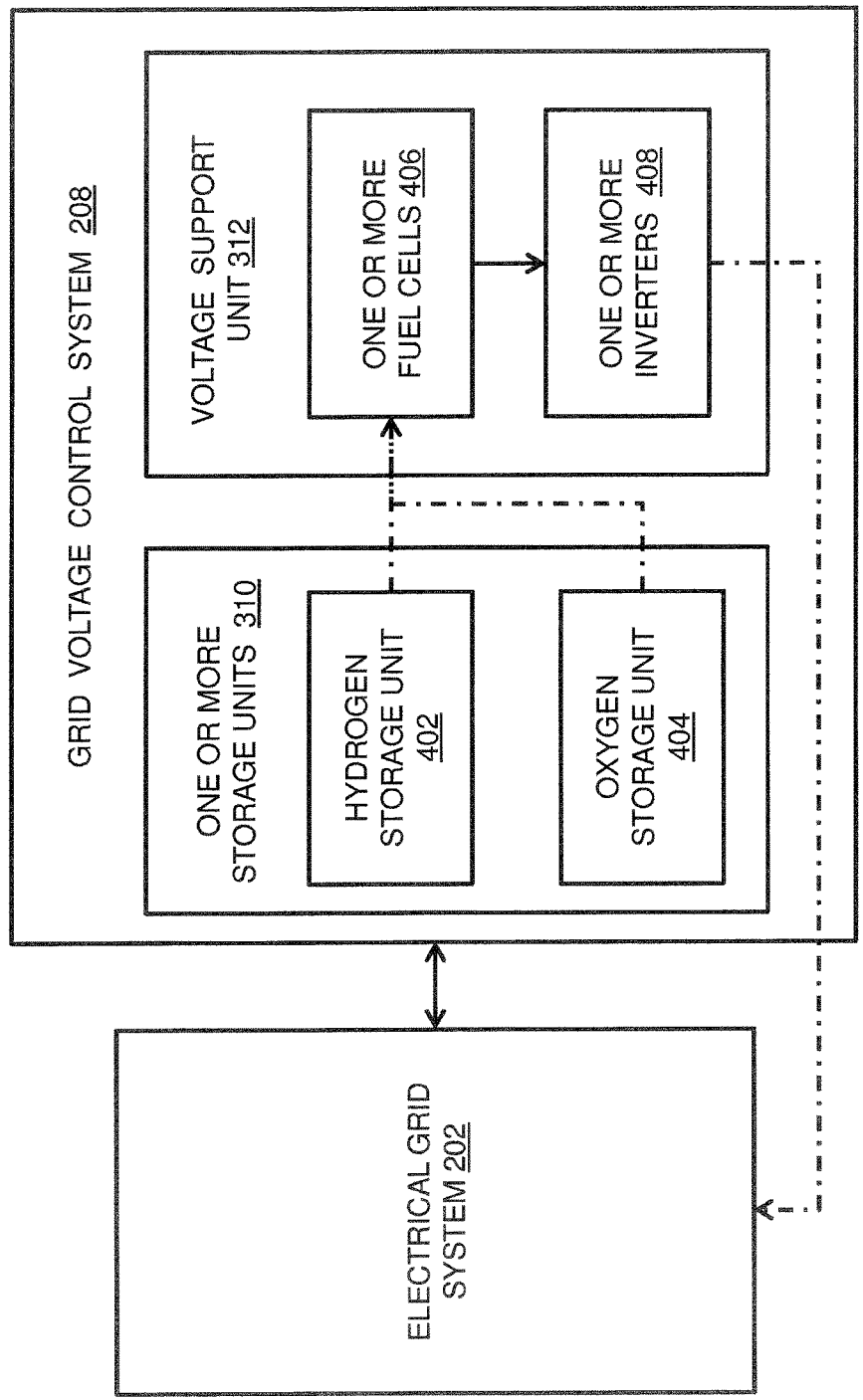

Having thus described the invention in general terms, reference will now be made to the accompanying drawings, which are not drawn to scale, and wherein:

FIG. 1 is a schematic block diagram illustrating a method for automatically controlling the voltage of an electric circuit following transient, dynamic circuit changes using a voltage buffer with one or more electrochemical devices, in accordance with embodiments of the present invention;

FIG. 2 is a schematic block diagram depicting an embodiment that can automatically control the voltage of an electrical grid transmission and distribution system following transient, dynamic circuit changes using a grid-voltage-control system with one or more, in accordance with embodiments of the present invention;

FIG. 3A is a schematic block diagram of an Alternating current (AC) grid-voltage-control system, in accordance with embodiments of the present invention;

FIG. 3B is a schematic block diagram of a DC grid-voltage-control system, in accordance with embodiments of the present invention; and FIG. 4 is a schematic block diagram depicting fuel cell-based voltage support to an alternating current (AC) electrical grid system, in accordance with an embodiment of the present invention.

Figure 5:
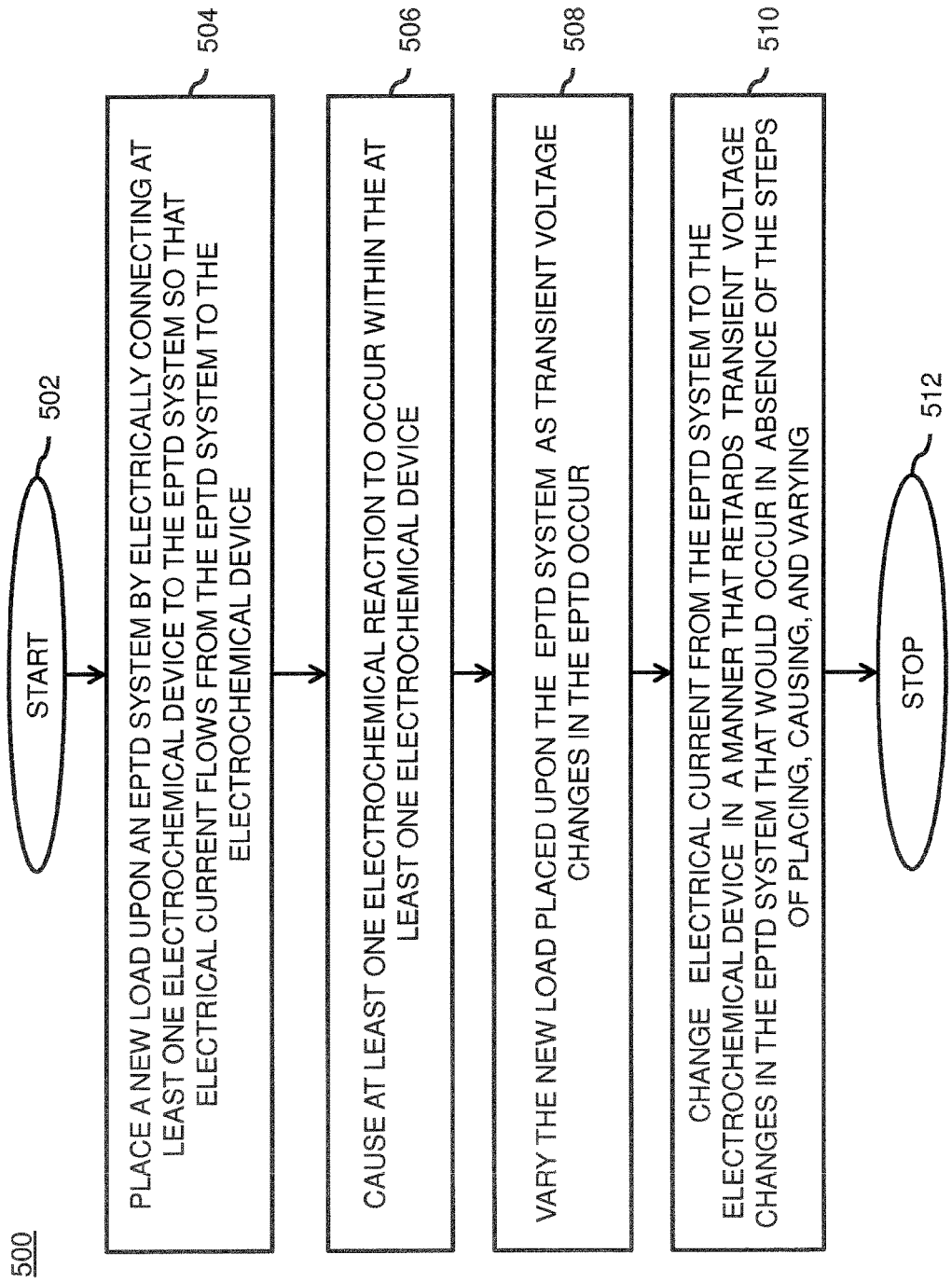

FIG. 5 is a schematic block diagram depicting a method version of the invention.

DETAILED DESCRIPTION

In the following description, for purposes of explanation, numerous specific details are set forth to support the claims that follow. Reference to "one embodiment" or "an embodiment" means that a particular feature, structure, or characteristic described in connection with the embodiment is included in at least one embodiment of the present technology. The appearance of the phrase "in one embodiment" is not necessarily referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, those skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features.

The invention can be characterized, as will be described below in connection with the drawings, as a buffer system for buffering the voltage of an electric system that undergoes transient voltage changes. Electrical system could be an electrical circuit (EC) system, or an electric power transmission and distribution (EPTD) system. The electric system includes at least one electrochemical device that places a new load on the electric system by being electrically connected to that system so that electrical current flows from the electric system to the electrochemical device. The at least one electrochemical device is constructed to cause at least one reaction to occur within it, thereby varying the new load placed upon the electric system as the increasing and decreasing transient voltage changes occur and causing changes in the electrical current from the electric system to the electrochemical device in a manner that retards transient voltage changes in the electric system that would occur in the absence of the buffer system.

Also as will be described further below, the at least one electrochemical device may be constructed with a voltage buffer capacity that is electrically connected to the electric system, and is constructed to provide feedback generated by electrochemical reaction. That feedback may be generated by the chemical thermodynamics of the electrochemical reaction. The buffer system may also include the electric system itself, and the buffer system may use alternating current (AC) and direct current (DC).

The at least one electrochemical device may be constructed as a water electrolyzer, and may further include an electric turbogenerator in electrical connection with the electric system. In that case, a supply of water would also be included for use with the electrolyzer to allow a water electrolysis to occur. A combustible fuel would be produced by the water electrolysis to drive the electric turbogenerator to produce AC electric power for delivery to the electric system.

In the version of the buffer system where the electric system transmits DC electric power, it will further include a current and voltage transformation subsystem that is constructed to transform the AC produced by the electric turbogenerator into DC at a voltage appropriate for delivery to the electric system.

The at least one electrochemical device may also be constructed to use chemical thermodynamics to retard increasing and decreasing electric voltage transients and, thereby, to cause the transient electric voltage to remain within one or more pre-specified voltage ranges. The at least one electrochemical device may also be used in combination with the electric power provided by one or more voltage support units, to cause the transient electric voltage to remain within one or more pre-specified voltage ranges.

The at least one electrochemical device may also be constructed as plural devices, such as multi-specie electrochemical devices and electrochemical devices electrically connected in series and parallel. Those plural devices are constructed to buffer the voltage of the electric system without requiring an increase in the physical dimensions of the devices.

The voltage buffer capacity of the buffer system may also be constructed to be higher than the voltage buffer capacity required to buffer voltage rises from loss of loads in the electric system. That voltage buffer capacity may also be constructed to buffer the voltage of the electric system and, thereby, to protect the electric system from overvoltage conditions chosen from the group consisting of events caused by nature and by humans.

The electric system associated with, or part of, the buffer system, may include a neutral circuit and, in that case, the at least one electrochemical device is electrically connected to the neutral circuit and is constructed to protect the electric system from an overvoltage, such as one that could be caused by external source of energy.

The at least one electrochemical device may also be electrically connected to the electric system in a way that provides ancillary services, as defined by the United States Federal Energy Regulatory Commission to the electric system. Those ancillary services may involve supplemental reserve capacity, voltage regulation, reactive power, or black-start capability.

The invention may also be characterized as a method for buffering the voltage of an electric system that undergoes transient voltage changes, including the step of placing a new load upon the electric system by electrically connecting at least one electrochemical device to it so that electrical current flows from the electric system to the electrochemical device. There are also the steps of causing at least one electrochemical reaction to occur within the at least one electrochemical device, and varying the new load placed upon the electric system as transient voltage changes in the electric occur. The method also involves changing the electrical current from the electric system to the electrochemical device in a manner that retards transient voltage changes in the electric system that would occur in the absence of the steps of placing, causing, and varying.

The step of causing electrochemical reactions may include using water electrolysis to produce a product that is a fuel, and the method may further include producing electric power and delivering it to the electric system. The at least one electrochemical device may apply chemical thermodynamics to retard increasing and decreasing electric voltage transients and cause the transient electric voltage to remain within a pre-specified voltage range.

The method may also include the step of connecting one or more voltage support units to the electric system to provide electric power, and to retard increasing and decreasing electric voltage transients that cause the transient electric voltage to remain within a pre-specified voltage range.

The at least one electrochemical device involved with the method may have a voltage buffer capacity that is higher than a buffer capacity required to buffer voltage rises from loss of all loads in the electric system. The electric system associated with the method may include neutral circuitry, and the at least one electrochemical device used in the method may be constructed with a buffer capacity to buffer the voltage of the electric system neutral circuitry to protect the electric system from overvoltage conditions caused by geomagnetically-induced voltage transient events.

The method may also involve electrically connecting the at least one electrochemical device to the electric system to provide one or more ancillary services, such as supplemental reserve capacity, voltage regulation, reactive power, and black-start capability as defined by the U.S. Federal Electric Regulatory Commission.

FIG. 1 illustrates a general overview of a system 100 using this application's method for automatically controlling a circuit voltage, in accordance with various embodiments of the present method disclosure. The system 100 is configured to automatically control the voltage associated with the electric circuit 102 by using an electrochemical device 110 as a voltage buffer 108 to control the voltage of the electric circuit. In addition, the system 100 is configured to retard increases or decreases in the voltage 104 of the electric circuit 102 during both transient under-voltage and over-voltage conditions resulting from dynamic transient circuit changes 106 such as sudden increases or reductions in load or power supply. Further, the system 100 is configured to drive the voltage of the electric circuit 102 back to the specified nominal level following the transient voltage condition occurrence.

The system 100 includes an electric circuit 102 and a voltage buffer control system 108. In an embodiment of the present method disclosure, the electric circuit 102 is an alternating current (AC) electric power transmission and distribution system or electrical grid system 202 as shown in FIG. 2. In another embodiment of the present method disclosure, the electric circuit 102 is a direct current (DC) electric power transmission and distribution system or electrical grid system 202.

FIG. 2 illustrates a general overview of a system 200 using an embodiment of this application's method for automatically controlling the voltage of an electrical grid system 202. It may be noted that to explain the system elements of FIG. 2, references will be made to the system elements of FIG. 1, FIG. 3A, and FIG. 3B. The electrical grid system 202 is a network of electrical components configured for supplying, transmitting and distributing electrical power. The electrical grid system may be either an AC electric power transmission and distribution system or a DC electric power and distribution system (as described in the Summary Section above) or any scaled or subdivided power system (such as a "microgrid") that provides electric power to customer loads.

Going further, the method associates the electrical grid system 202 with the grid-voltage-control system 208. In an embodiment of the present method disclosure, the electrical grid system 202 is electrically coupled to the grid-voltage-control system 208. In addition, the electrical grid system 202 includes a load placed upon it to allow the automatic control of grid voltage during transient grid under-voltage conditions and transient grid over-voltage conditions 206. Moreover, the load corresponds to an electrical load which is automatically increased upon, reduced, or removed completely (also referred to as terminated) from the electrical grid system 202 by the method's grid-voltage-control system 208 through the application of chemical thermodynamic properties of the method's grid-voltage-control system components.

Referring to FIG. 2, the box 206 that depicts transient voltage conditions encompasses load changes, generation changes, operator switching, icing, fire, cable expansion or contraction, and any other conditions that cause changes in voltage.

Further, as shown on FIG. 2, the grid-voltage-control system 208 includes one or more units 208a. Moreover, the electrical grid system 202 is electrically coupled to the grid-voltage-control system 208 through a unit of the one or more units 208a of the grid-voltage-control system 208 (elaborated in the detailed descriptions of FIG. 3A and FIG. 3B). Furthermore, the grid-voltage-control system 208 corresponds to a system configured by the method for automatically controlling the grid voltage associated with the electrical grid system 202. In an embodiment of the present method disclosure, the grid-voltage-control system 208 controls transient fluctuations in the grid voltage that are caused by dynamic, transient circuit changes 206 in the electrical grid system 202. In an embodiment of the present method disclosure, the one or more units 208a of the grid-voltage-control system 208 collectively control the grid voltage of the electrical grid system 202.

The grid-voltage-control system 208 automatically controls the grid voltage of the electrical grid system 202 during transient under-voltage or over-voltage conditions.

Moreover, the grid-voltage-control system 208 controls the grid voltage of the electrical grid system 202 by utilizing oxidation and reduction reactions of one or more chemical species taking place in the grid-voltage-control system 208 (as explained below in the detailed description of FIG. 3A and 3B). In addition, the grid-voltage-control system 208 utilizes Nernstian behavior of one or more chemical species in an electrochemical device 308 to control the grid voltage of the electrical grid system 202 during grid transient under-voltage or over-voltage condition. Also, in an embodiment to the method, the grid-voltage-control system 208 provides contingency voltage support to the electrical grid system 202 to raise the grid voltage during select grid under-voltage conditions.

In an embodiment of the present method disclosure, the grid-voltage-control system 208 utilizes a pre-defined combination of the one or more units 208a to provide voltage support to the electrical grid system 202 during grid under-voltage conditions. Further, the grid-voltage-control system 208 controls the grid voltage of the electrical grid system 202 by reducing or terminating the electrical demand of a load coupled to the electrical grid system 202 during grid under-voltage conditions. Furthermore, the grid-voltage-control system 206 controls the grid voltage of the electrical grid system 202 by adding a load on the electrical grid system 202 during grid over-voltage conditions.

FIG. 3A illustrates a block diagram 300 showing various units of an AC grid-voltage-control system 302, in accordance with various embodiments of the present method disclosure. It may be noted that to explain the system elements of FIG. 3A, references will be made to the system elements of FIG. 2. In addition, the components of the AC grid-voltage-control system 302 are collectively configured for automatically controlling the grid voltage of the electrical grid system. In an embodiment of the present method disclosure, the components correspond to the one or more units 208a of the grid-voltage-control system 208. The AC grid-voltage-control system 302 includes one or more transformers 304, one or more rectifying devices 306, one or more electrochemical devices 308, one or more storage units 310, and a voltage support unit 312. The above stated components of the AC grid-voltage-control system 302 collectively perform the automatic control of the grid voltage of the AC electrical grid system 202.

It may be noted that in FIG. 3A, the grid-voltage-control system 302 includes one or more transformers 304, one or more rectifying devices 306, one or more electrochemical devices 308, such as electrolysis devices, one or more storage units 310, and the voltage support unit 312. Together, the aforementioned components of the system 302 automatically control the grid voltage of the electrical grid system 202. There are also multiple units of the grid-voltage-control system 208 (utilizing AC voltage) or grid-voltage-control systems (utilizing DC voltage) which can also automatically control the grid voltage of the electrical grid system 202. With respect to electrochemical devices 308, they can be both electrolysis ones and non-electrolysis ones. Examples of non-electrolysis ones are electrolytic metal plating baths and electrolytic metal refiners, liquid or gel batteries, liquid or gel capacitors, and organic semiconductors.

Each of the one or more transformers 304 is associated with the electrical grid system 202. Each of the one or more transformers 304 is electrically coupled to the electrical grid system 202. In addition, each of the one or more transformers 304 is operationally coupled to the transmission lines of the electrical grid system 202. The operational coupling of the one or more transformers 304 to the electrical grid system 202 is done through any medium presently known in the art including but not limited to metallic cable and metallic bus bars. The coupling is done to allow transfer of electrical energy flowing in the transmission lines 204 to the one or more transformers 304 for performing one or more operations (described below in the patent application).

Going further, one or more transformers 304 is configured for drawing the high voltage AC flowing through the transmission lines 204 of the electrical grid system 202. In an embodiment of the present method disclosure, each of the one or more transformers 304 draw voltage, whether there is a high-voltage, low-voltage, or normal voltage condition.

The method requires that the AC grid-voltage-control system 208 have one or more transformers 304 configured to step down the high voltage AC flowing through a transmission line 204 of the electrical grid system 202 to provide a low voltage AC with a voltage approximately equal to the standard reference potential overvoltage (described in the Summary Section above) for the chemical systems in one or more electrochemical devices 308 when grid voltage is at the lower operating voltage level permitted by the operating specifications of the grid. The high voltage AC is consequently stepped down to voltages lower than the standard reference potential overvoltage when the grid voltage of the electrical grid system 202 decreases below the desired lower operating grid voltage level and to voltages higher than the standard reference potential overvoltage when the grid voltage of the electrical grid system 202 increases above the lower operating grid voltage level. In an embodiment of the method when the electrical grid system transmits DC instead of AC, the step down transformers 304 of the DC grid-voltage-control system provide low voltage DC at a voltage approximately equal to the standard reference potential overvoltage when grid voltage is at the lower operating voltage level permitted by the operating specifications of the grid.

Going further, one embodiment of the method requires that the low voltage AC output of the one or more step down transformers 304 is operationally coupled to one or more rectifying devices 306 to convert the AC to DC at the same or nearly the same voltage. In an embodiment of the present method disclosure, if the high voltage grid is DC, the step down transformer will be a Brentford transformer or similar device such as a precision resistor voltage divider. If the high voltage grid is DC instead of AC, no rectifying devices need be connected to the output of the step down transformers.

Further, the electrical coupling between the one or more transformers 304 and the one or more rectifying devices 306 is done through any medium presently known in the art as suitable to transfer high current low voltage DC including but not limited to metallic cable or metallic bus bars. The coupling of each of the one or more rectifying devices 204 to the one or more transformers 304 is done to convert the AC at a low voltage into a DC at a low voltage enabling it to be supplied to the one or more electrochemical devices 308. The one or more electrochemical devices vary their electrochemical reaction rates in accordance with chemical thermodynamics (described in the Summary Section above) as a function of grid voltage changes causing changes in the low voltage DC thereby decreasing or increasing the current loading the one or more electrochemical devices place upon the grid.

In an embodiment of the present method disclosure, one or more electrochemical devices 308 are connected to the neutral Wye terminal of one or more transformers 304 connected to the grid. The neutral circuit will normally have zero voltage. However, when the grid is affected by an external event (as described in the Background Section above) that induces voltage in the neutral circuit, the electrochemical device connected to this circuit will automatically begin an electrochemical reaction once the voltage rises to the standard reference potential overvoltage level and the electrochemical reaction rate will increase exponentially with increasing induced voltage above the standard reference potential overvoltage. This provides a load upon the neutral circuit which will retard the voltage increase being induced in the circuit by the external event. In an embodiment of the method, multiple electrochemical devices may be connected in a series or parallel configuration. Alternatively, multispecie electrochemical devices may be connected separately or in combination to maximize the electrochemical-reaction rate within the electrochemical devices. Maximizing that reaction rate increases the rate at which a load is added to the neutral circuit and maximizes the ability of the system to prevent excessive induced voltages from external events. Multispecie electrochemical devices are multiple combinations of electrolyzers and electrolyzers with multiple electrochemical reactions taking place in the same electrolyzer, which may be of different kinds and connected in series and/or parallel. The electrolyzers are provided as best suited to: (i) the particular transmission line, including its length; (ii) expectations of induced energy and rate of rises in either or both voltage and current; and (iii) and the type of pulses to be handled, such as geo-magnetically induced pulses.

In an embodiment of the present method disclosure, each of the one or more electrochemical devices 308 are coupled to the one or more rectifying devices 306 in series or in parallel configuration.

In an embodiment to the method, the one or more electrochemical devices 308 are configured to perform electrolysis of the one or more chemical species at a potential equal to or above the standard reference potential overvoltage. In an embodiment of the present method disclosure, one or more electrochemical devices 308 is a water electrolysis unit. In an embodiment of the present method disclosure, one or more electrochemical devices 308 is an electrolytic metal plating bath. In another embodiment of the present method disclosure, one or more electrochemical devices 308 is an electrolytic metal refiner.

FIG. 3B illustrates a block diagram 350 showing various units of a DC grid-voltage-control system, in accordance with various embodiments of the present method disclosure. It may be noted that to explain the system elements of FIG. 3B, references will be made to the system elements of FIG. 2, FIG. 3A, and FIG. 3B. In addition, the components of the DC grid-voltage-control system are collectively configured for automatically controlling the grid voltage of the electrical grid system 202. In an embodiment of the present method disclosure, the components correspond to the one or more units 208a of the grid-voltage-control system 302. The DC grid-voltage-control system includes one or more transformers 304, one or more electrochemical devices 308, one or more storage units 310, and a voltage support unit 312. The above stated components of the DC grid-voltage-control system collectively perform the automatic control of the grid voltage of the DC electric grid-voltage-control system in the same manner and method as the AC electrical grid system 302 with the exceptions that rectifying devices 204 are not needed to transform the step down transformer output to DC and that inverters 308 are not needed to transform the electric power generated by hydrogen fuel cells into AC to be provided to the grid 202.

FIG. 4 illustrates a block diagram 400 showing various units of grid-voltage-control system 208, in accordance with various embodiments of the present method disclosure. It may be noted that to explain the system elements of FIG. 4, references will be made to the system elements of FIG. 2, FIG. 3A, and FIG. 3B. In an embodiment of the present method disclosure, one or more reaction products produced by one or more electrochemical devices 308 include hydrogen and oxygen produced by the disassociation of water into its elemental and gaseous components of hydrogen and oxygen. In addition, each reaction product of the one or more reactions products is stored in a corresponding storage unit 310. In another embodiment, one or more storage units contains reserve aqueous electrolyte at a pressure head sufficient to replenish the electrochemical device when needed.

Moreover, the method provides that the one or more reaction products are produced and stored in one or more separate storage units 310 on a consistent basis during nominal grid voltage conditions ensuring that a stockpile of the one or more reaction products will be available for contingency use by the method's voltage support unit 312 when that unit is desired to operate automatically during transient undervoltage conditions or is desired to operate manually at any time at the discretion of a local or remote grid operator. Stored reaction products in an amount excess to the contingency power production grid reliability needs of the grid owner may be withdrawn and used by the owner at any time for any commercial or otherwise beneficial process or purpose at the discretion of the owner.

The method also provides storage capacity for the one or more reaction products that is sized to accommodate the increased production rate of reaction products that will occur when the grid voltage increases above its nominal level.

Going further, one or more electrochemical devices 308 is associated with and connected to the corresponding one or more storage units 310 through any common, pressure retaining connecting medium that does not appreciably react with the reaction products, including but not limited to copper tubing or pipe, high density polyethylene plastic pipe, or steel pipe or any other medium commonly used in the trade to transport pressurized hydrogen or oxygen.

Furthermore, each of the one or more storage units 310 is configured for storing each of the one or more reaction products produced from the electrolysis of water in the one or more electrochemical devices 308. In an embodiment of the present method disclosure, each reaction product of the one or more reaction products is stored in a separate storage unit of the one or more storage units 310. In another embodiment of the present method disclosure, hydrogen is stored in a hydrogen storage unit 302 of the one or more storage units 310. In yet another embodiment of the present method disclosure, oxygen is stored in an oxygen storage unit 304 of the one or more storage units 310.

The method provides for the connection of the reaction products storage units 310 to the one or more voltage support units 312 for the purpose of generating electric power as a contingency voltage support measure for the grid when a combination of independent events causing undervoltage transients is so severe that the decrease of grid loading by the one or more electrochemical devices cannot offset the continuing voltage drop and there is risk of the grid becoming de-energized. In this embodiment a connection between the one or more storage units 310 and the one or more voltage support units 312 is opened automatically or under the control of a local or remote operator to utilize them to provide voltage support to the electrical grid system 202 during the grid under-voltage condition. The method also provides automatic supply of the reaction products to the voltage support units by interposing one or more normally-closed, fail-open DC powered isolation valves in the piping or tubing connecting the one or more storage units to one or more the voltage support units with the DC power to the valves being supplied by a connection to the DC circuit that powers the one or more electrochemical devices so that when the voltage drops to a level below the standard reference potential overvoltage and the circuit current drops to zero, or when a local or remote operator disconnects the DC circuit, the current to the valves will be insufficient to hold the valves in their normally closed position and they will fail to the open position thereby permitting the flow of reaction products from the storage units to the one or more voltage support units.

The method uses one or more electrochemical devices 308 capable of pressurizing the gaseous reaction products to a pressure above atmospheric pressure. In an embodiment to the method, the method uses one or more electrochemical devices that produce reaction products at atmospheric pressure and passes the reaction products through one or more, separate, product specific compressors before passing the reaction products to the one or more storage units 310. The one or more compressors are mechanical devices which increase the pressure of gases by reducing volume. In addition, the method allows the compressors to be of any type of compressor in common use provided the compressor materials are essentially inert to reactions with the reaction product being compressed, gas tight, and spark-resistant. Suitable compressors include but are not limited to gas-driven compressors, centrifugal compressors, diagonal or mixed flow compressors, axial flow compressors, reciprocating compressors, rotary screw compressors, rotary vane compressors, scroll compressors, diaphragm compressors and the like.

In one embodiment to the method, the voltage support unit includes one or more hydrogen fuel cells 306 that use hydrogen as fuel in a reaction with ambient air or the stored oxygen to generate DC electrical power. This power can be transformed by one or more inverters 308 into AC and transferred to an AC grid through one or more transformers 304 that step up the voltage to grid specifications. In another embodiment, the voltage support unit includes one or more hydrogen fuel cells 306 that use hydrogen as fuel in a reaction with ambient air or the stored oxygen to generate DC electrical power. This power can be transferred to a DC grid through one or more transformers 304 that step up the voltage to grid specifications without need for an inverter. In another embodiment, the voltage support unit includes one or more hydrogen combustion-driven turbogenerators to generate low voltage AC electrical power. This power can be transferred to an AC grid through one or more transformers 304 that step up the voltage to grid specifications. In yet another embodiment, the voltage support unit includes one or more hydrogen combustion-driven turbogenerators to generate low voltage AC electrical power. This power can be transformed to low-voltage DC by one or more rectifying devices 306 and transferred to a DC grid through one or more transformers 304 that step up the voltage to grid specifications.

Accordingly, the voltage support unit 312 is electrically coupled to the electrical grid system 202. In an embodiment of the present method disclosure, the voltage support unit 312 is electrically coupled to the electrical grid system 202 through the one or more transformers 304, and the one or more rectifying devices 306. Moreover, the coupling of the voltage support unit 312 and the electrical grid system 202 is done through any common type of electrical power medium rated for the voltage service, including but not limited to metallic cable or metallic bus bars. The method further provides that, the voltage support unit 312 utilizes the oxidation and the reduction of the one or more reaction products in either one or more combustion-driven electrical turbogenerators or one or more hydrogen fuel cells to produce electrical power when the grid voltage of the electrical grid system 202 decreases below a specified, pre-defined, low voltage operating design limit. Furthermore, the voltage support unit 306 is configured to operate automatically when the grid voltage of the electrical grid system 202 drops below the specified, pre-defined low level for the grid voltage.

In an embodiment of the present method disclosure, the rate of the electrolysis reaction of the one or more electrochemical devices 206 begins to decrease when the grid supplied voltage begins to drop below the nominal operating voltage of the electrical grid system 202. Accordingly, when the voltage drops below the standard reference potential overvoltage, the flow of current inside each of the one or more electrochemical devices 206 stops.

In an embodiment of the present disclosure of the chemical thermodynamics of the method, the grid voltage control unit 304 reduces or increases the electrical demand of the load by utilizing Nernstian behavior of labile ions of the electrochemical system applicable at a concentration and electrode conditions of each of the one or more electrochemical devices 206 coupled to the electrical grid system 102. In another embodiment of the present method disclosure, Nernstian behavior is utilized to reduce the load coupled to the electrical grid system 102 and thereby increase the grid voltage during transient under-voltage conditions. In another embodiment of the present method disclosure, Nernstian behavior is utilized to increase the load coupled to the electrical grid system 102 and thereby decrease the grid voltage during transient over-voltage conditions.

Going further, the purpose of automatically controlling of the grid voltage of the electrical grid system 102 is transferred to the voltage support unit voltage support unit 306 of the grid-voltage-control system 106 when the grid voltage decreases below the specified emergency separation level of the grid voltage. The voltage support unit voltage support unit 312 is configured to then provide sufficient contingency power for black start restart of power generating stations or for emergency power to selected, priority grid loads. In addition, if desired by the transmission system operator, the purpose of controlling of the grid voltage of the electrical grid system 102 can be manually transferred to the voltage support unit 312 of the grid-voltage-control system 208 at any time at the discretion of the transmission system operator. The voltage support unit voltage support unit 220 is configured to then provide contingency power to augment normal generation sources and thereby raise the grid voltage. In addition, the voltage support unit 312 utilizes the one or more reaction products produced from the electrolysis of water to provide contingency power and raise the grid voltage of the electrical grid system 202.

In an embodiment to the method the voltage support unit 312 is also configured to raise the grid voltage of the electrical grid system 202 by utilizing one or more fuel cells 306 to generate contingency electric power which can be transferred to the electrical grid system 202 as described in paragraph 0088. In an embodiment to the present disclosure, the voltage support unit 312 raises the grid voltage of an electrical grid system by utilizing the one or more fuel cells 406 by providing hydrogen from the hydrogen storage unit 402 to each of the one or more fuel cells 406 and adding oxygen from the oxygen storage unit 404 to each of the one or more fuel cells 406. Accordingly, the voltage support unit 312 raises the grid voltage of the electrical grid system 202 by inducing reaction of the hydrogen and the oxygen in each of the one or more fuel cells 306.

Further, each of the one or more fuel cells 306 is associated with one or more valves for enabling supply of the hydrogen from the one or more hydrogen storage units 302 and the oxygen from the one or more oxygen storage unit 304. In an embodiment of the present method disclosure, the valves are opened automatically when the current in each of the one or more electrochemical devices 308 drops to zero.

Further, the increase in the loading on the electrical grid system 102 retards the increase in the grid voltage during the transient over-voltage condition. In an embodiment of the present method disclosure, each of the one or more electrochemical devices 308 is configured to increase the loading on the electrical grid system 202 by utilizing the Nernstian behavior of each of the one or more electrochemical devices 308 coupled to the electrical grid system 202 and retard the increase in grid voltage of the electrical grid system 202 by utilizing the increase in the loading on the electrical grid system 202.

In addition, one or more electrochemical devices 308 is configured to capture the excessive amount of the electrical energy from the electrical grid system 202, convert the captured excessive amount of the electrical energy into chemical potential energy and storing the potential energy in one of the storage units 310. Further, each of the one or more electrochemical devices 206 enable the increase in the loading on the electrical grid system 102 by utilizing the Nernstian behavior of the labile ions of the electrochemical system applicable at the concentration and the electrode conditions of each of the one or more electrochemical devices 308 coupled to the electrical grid system 202.

Also, the voltage support unit 312 utilizes the Nernstian behavior of the labile ions of the electrochemical system applicable at the concentration and the electrode conditions of each of the one or more electrochemical devices 308 coupled to the electrical grid system 202 to control the grid voltage within the design and the operating limits without needing voltage monitoring or operator action. In an embodiment of the present method disclosure, no manual action is required to be taken by a grid operator for reducing the excessive voltage on the electrical grid system 202.

In an embodiment of the present method disclosure, the one or more electrochemical devices 308 are connected in parallel with differing proportionate DC supply voltages for suppressing large magnitude overvoltage transients. Also, the parallel connection enables each of the one or more electrochemical devices to always be in the Nernstian conditions acting as a buffer to retard the increasing grid voltage. Further, a multi species and multi electrode reduction system can be used for large magnitude overvoltage transients for utilizing a variety of redox potentials to provide overlapping Nernstian behavior for voltage buffering.

The present method and system provided in the disclosure has many advantages over the prior art. As mentioned above, the method's grid-voltage-control system automatically controls the grid voltage of the electrical grid system both during transient under-voltage and over-voltage conditions. The present system and method allows the grid operator not to have to perform any manual operation on the electrical grid system to raise or reduce the grid voltage during dynamic, transient circuit change events to have the grid voltage return to the previous nominal level. Further, the present method accomplishes this by relying solely upon the impermutable natural law of fixed, characteristic chemical thermodynamics that reflects the Nernstian behavior of labile ions in an electrochemical devices to add or reduce the loading on an electric circuit in opposition to transient voltage changes to return the electrical system to nominal conditions Also, the present method reduces the pollution in the environment by not emitting harmful pollutants during generation of contingency electric power. Also, the present system and method does not adversely impact local ecosystems.

The invention may also be described in the following numbered paragraphs.

1. A buffer system for buffering the voltage of an electric power transmission and distribution (EPTD) system that undergoes transient voltage changes, comprising:

at least one electrochemical device that places a new load on the EPTD system by being electrically connected to that system so that electrical current flows from the EPTD system to the electrochemical device; and wherein the at least one electrochemical device is constructed to cause at least one reaction to occur within it, thereby varying the new load placed upon the EPTD system as the increasing and decreasing transient voltage changes occur and causing changes in the electrical current from the EPTD system to the electrochemical device in a manner that retards transient voltage changes in the EPTD system that would occur in the absence of the buffer system.

2. The buffer system of paragraph 1, wherein the at least one electrochemical device is constructed with a voltage buffer capacity, is electrically connected to the EPTD system, and is constructed to provide feedback generated by electrochemical reaction.

3. The buffer system of paragraph 2, wherein the at least one electrochemical device is constructed to provide feedback generated by the chemical thermodynamics of the electrochemical reaction.

4. The buffer system of paragraph 1, further including the EPTD system.

5. The buffer system of paragraph 2, wherein the electric current associated with the EPTD is chosen from the group consisting of alternating current and direct current.

6. The buffer system of paragraph 3, wherein the at least one electrochemical device is constructed as a water electrolyzer, and further includes an electric turbogenerator in electrical connection with the EPTD system; a supply of water for use with the electrolyzer to allow a water electrolysis to occur; a combustible fuel produced by the water electrolysis to drive the electric turbogenerator to produce alternating current (AC) electric power for delivery to the EPTD system.

7. The buffer system of paragraph 6, wherein the EPTD system transmits direct current (DC) electric power, and further including a current and voltage transformation subsystem that is constructed to transform the AC produced by the electric turbogenerator into DC at a voltage appropriate for delivery to the EPTD system.

8. The buffer system of paragraph 2, wherein the at least one electrochemical device is constructed to use chemical thermodynamics to retard EPTD voltage transients chosen from the group consisting of increasing and decreasing ones and, thereby, to cause the transient EPTD voltage to remain within one or more pre-specified voltage ranges.

9. The buffer system of paragraph 2, wherein at least one electrochemical device is constructed to use chemical thermodynamics to retard EPTD voltage transients chosen from the group consisting of increasing and decreasing ones and, in combination with the electric power provided by one or more voltage support units, to cause the transient EPTD voltage to remain within one or more pre-specified voltage ranges.

10. The buffer system of paragraph 1, wherein the at least one electrochemical device is constructed as plural devices chosen from the group consisting of multi-specie electrochemical devices and electrochemical devices electrically connected in series and parallel, and wherein the plural devices are constructed to buffer the voltage of the EPTD system without requiring an increase in the physical dimensions of the devices.

11. The buffer system of paragraph 2, wherein the voltage buffer capacity is constructed to be higher than the voltage buffer capacity required to buffer voltage rises from loss of loads in the EPTD system.

12. The buffer system of paragraph 2, wherein the voltage buffer capacity is constructed to buffer the voltage of the EPTD system and, thereby, to protect the EPTD system from overvoltage conditions chosen from the group consisting of events caused by nature and by humans.

13. The buffer system of paragraph 1, wherein the EPTD system includes a neutral circuit, and the at least one electrochemical device is electrically connected to the neutral circuit and is constructed to protect the EPTD system from an overvoltage.

14. The buffer system of paragraph 13, wherein the at least one electrochemical device is constructed to protect the EPTD system from an overvoltage caused by external source of energy.

15. The buffer system of paragraph 1, wherein the at least one electrochemical device is electrically connected to the EPTD system in a way that provides Ancillary services as defined by the United States Federal Energy Regulatory Commission to the EPTD system, and wherein the Ancillary services are chosen from the group consisting of supplemental reserve capacity, voltage regulation, reactive power, and black-start capability.

16. A buffer system for buffering the voltage of an electric circuit (EC) system that undergoes transient voltage changes, comprising:

at least one electrochemical device that places a new load on the EC system by being electrically connected to that system so that electrical current flows from the EC system to the electrochemical device; and wherein the at least one electrochemical device is constructed to cause at least one reaction to occur within it, thereby varying the new load placed upon the EC system as the increasing and decreasing transient voltage changes occur and causing changes in the electrical current from the EC system to the electrochemical device in a manner that retards transient voltage changes in the EC system that would occur in the absence of the buffer system.

17. The buffer system of paragraph 16, wherein the at least one electrochemical device is constructed with a voltage buffer capacity, is electrically connected to the EC system, and is constructed to provide feedback generated by electrochemical reaction.

18. The buffer system of paragraph 17, wherein the at least one electrochemical device is constructed to provide feedback generated by the chemical thermodynamics of the electrochemical reaction.

19. The buffer system of paragraph 16, further including the EC system.

20. The buffer system of paragraph 19, wherein the electric current associated with the EC is chosen from the group consisting of alternating current and direct current.

21. The buffer system of paragraph 20, wherein the at least one electrochemical device is constructed as a water electrolyzer, and further includes an electric turbogenerator in electrical connection with the EC system; a supply of water for use with the electrolyzer to allow a water electrolysis to occur; a combustible fuel produced by the water electrolysis to drive the electric turbogenerator to produce alternating current (AC) electric power for delivery to the EC system.

22. The buffer system of paragraph 21, wherein the EC system transmits direct current (DC) electric power, and further including a current and voltage transformation subsystem that is constructed to transform the AC produced by the electric turbogenerator into DC at a voltage appropriate for delivery to the EC system.

23. The buffer system of paragraph 19, wherein the at least one electrochemical device is constructed to use chemical thermodynamics to retard EC voltage transients chosen from the group consisting of increasing and decreasing ones and, thereby, to cause the transient EC voltage to remain within one or more pre-specified voltage ranges.

24. The buffer system of paragraph 19, wherein at least one electrochemical device is constructed to use chemical thermodynamics to retard EC voltage transients chosen from the group consisting of increasing and decreasing ones and, in combination with the electric power provided by one or more voltage support units, to cause the transient EC voltage to remain within one or more pre-specified voltage ranges.

25. The buffer system of paragraph 16, wherein the at least one electrochemical device is constructed as plural devices chosen from the group consisting of multi-specie electrochemical devices and electrochemical devices electrically connected in series and parallel, and wherein the plural devices are constructed to buffer the voltage of the EC system without requiring an increase in the physical dimensions of the devices.

26. The buffer system of paragraph 17, wherein the voltage buffer capacity is constructed to be higher than the voltage buffer capacity required to buffer voltage rises from loss of loads in the EC system.

27. The buffer system of paragraph 17, wherein the voltage buffer capacity is constructed to buffer the voltage of the EC system and, thereby, to protect the EC system from overvoltage conditions chosen from the group consisting of events caused by nature and by humans.

The foregoing descriptions of specific embodiments of the present method and technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A method for buffering the voltage of electric circuit (EC) system that undergoes transient voltage changes, above or below a nominal operating voltage of the EC system, during use as a result of variances in loads on, or power to, the EC system, comprising:

placing a new load upon the EC system and its normal operating voltage by electrically connecting an electrochemical device to the EC system by a direct current (DC) circuit via a voltage transformer;

selecting a step-up or step-down transformer rating for the voltage transformer for causing the new load to have a voltage that varies without regulation in proportion to the voltage of the EC system during transient voltage changes;

selecting a capacity, a chemical concentration and an electrode design for the electrochemical device, wherein the selecting steps cause the new load to be powered by the EC system at voltage levels that cause at least one electrochemical reaction exhibiting Nernstian behavior of the reaction rate to occur within the electrochemical device;

providing, during a first transient voltage change in the EC system, additional voltage from the EC system to the electrochemical device to exponentially increase the load on the EC system when the EC system voltage increases, to retard the first transient voltage change that would occur in the absence of the placing, selecting and providing steps; and providing, during a second transient voltage change in the EC system, reduced voltage from the EC system to the electrochemical device to exponentially decrease the load on the EC system when the EC system voltage decreases, to retard the second transient voltage change that would occur in the absence of the placing, selecting and providing steps.

2. The method of claim 1, wherein the at least one-electrochemical reaction is an electrolysis reaction to produce a product that is a fuel.

3. The method of claim 1, wherein the at least one electrochemical reaction is an electrolysis reaction that produces a hydrogen fuel, and wherein the method further comprises:

delivering the hydrogen fuel to a hydrogen fuel cell;
producing, in the hydrogen fuel cell, a DC electric power;
inverting the DC electric power produced by the hydrogen fuel cell into AC electrical power; and
delivering the AC electrical power to the EC system.

4. The method of claim 3, wherein the EC system transmits direct current (DC) electric power, and further including transforming the DC produced by the hydrogen fuel cell into high voltage DC, and delivering it to the EC system.

5. The method of claim 1, wherein the at least one electrochemical reaction is an electrolysis reaction to produce a product that is a fuel; and wherein the method further includes producing alternating current ("AC") electric power from an AC-power generator powered by the fuel, and delivering the AC electric power to one of: an AC EC system, and an AC distribution system normally coupled to the AC EC system.

6. The method of claim 5, wherein the EC system transmits direct current (DC) electric power, and further including transforming the AC electrical power produced by the AC-power generator into a DC electrical power at a voltage appropriate for delivery to the EC system, and delivering the DC electrical power to the EC system.

7. The method of claim 1, wherein the electrochemical device is sized to allow an amount of EC system voltage control by reducing the magnitude of transient voltage changes, and the amount of EC system voltage control enables adjustment to the EC system that results in a zero derivative of EC system current with respect to EC system voltage before the voltage transient exceeds the limits of a desired control range.

8. The method of claim 1, further including connecting one or more voltage support units to the EC system to provide electric power to the EC system, and wherein the electrochemical device applies chemical thermodynamics and the one or more voltage support units provides electric power to retard increasing and decreasing EC voltage transients to cause the transient EC voltage to remain within a pre-specified voltage range.

9. The method of claim 1, wherein the electrochemical device has a voltage buffer capacity that is higher than a buffer capacity required to buffer voltage rises from loss of all other loads in the EC system.

10. The method of claim 1, wherein the EC system includes DC circuitry that is connected to the electrochemical device at a nominal voltage, and wherein the electrochemical device is constructed with a buffer capacity to buffer the voltage of the EC system DC circuitry to protect the EC system from overvoltage conditions caused by geomagnetically-induced voltage transient events.

11. The method of claim 10, wherein the selecting steps cause the new load normally to be powered by the EC system at voltage levels below the Standard Reference Potential of the electrochemical device that causes no electrochemical reaction to occur until a voltage transient occurs on the EC system that raises the voltage supplied to the electrochemical device above the Standard Reference Potential to cause at least one electrochemical reaction exhibiting Nernstian behavior of the reaction rate to occur within the electrochemical device.

12. The method of claim 1, wherein the EC system is an electric power transmission distribution system.

13. A system for retarding transient voltage changes occurring on an electric circuit (EC) system, above or below a nominal operating voltage of the EC system, the system comprising:
   an EC system, wherein the EC system comprises a high voltage transmission line;
   a DC circuit;
   a step down transformer connected to the EC system to step down a high voltage on the high voltage transmission line of the EC system to provide a lower voltage that varies without regulation in proportion to the high voltage of the EC system during transient voltage changes;
   an electrochemical device electrically connected through the step down transformer to the EC system so that electrical current can flow from the EC system to the electrochemical device, wherein the step down transformer comprises a voltage transformer rating and the electrochemical device comprises a capacity, a chemical concentration and an electrode design that are selected to cause the electrochemical device to be powered by the EC system at voltage levels that cause at least one electrochemical reaction exhibiting Nernstian behavior of the reaction rate to occur within the electrochemical device so that the lower voltage flowing to the electrochemical device varies with changes in the voltage level on the high voltage transmission line causing the load provided by the electrochemical device to exponentially vary to retard transient voltage changes occurring on the EC system that occur as a result of variances in loads on or power to the EC system;
   wherein the system provides, during a first transient voltage change in the EC system, additional power from the EC system to the electrochemical device to exponentially increase the load on the system when the EC system voltage increases, to retard the first transient voltage change; and
   wherein the system provides, during a second transient voltage change in the EC system, reduced power from the EC system to exponentially decrease the load on the system when the EC system voltage decreases, to retard the second transient voltage change.

14. The system of claim 13, wherein the at least one electrochemical reaction is an electrolysis reaction to produce a product that is a fuel.

15. The system of claim 14, wherein the system further comprises an alternating current (AC)-power generator that is powered by the fuel to produce an AC electric power and to deliver the AC electric power to the EC system.

* * * * *